United States Patent
Chen et al.

(10) Patent No.: US 9,143,272 B2
(45) Date of Patent: Sep. 22, 2015

(54) SERIAL INTERFACE PACKET INFORMATION DETECTION AND CONTROL METHOD AND RECEIVER THEREOF

(71) Applicant: NOVATEK Microelectronics Corp., Hsin-Chu (TW)

(72) Inventors: I-Min Chen, Hsinchu County (TW); Wei-Ying Tu, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 178 days.

(21) Appl. No.: 13/966,304

(22) Filed: Aug. 14, 2013

(65) Prior Publication Data
US 2014/0372834 A1    Dec. 18, 2014

(30) Foreign Application Priority Data
Jun. 18, 2013    (TW) .............................. 102121618 A

(51) Int. Cl.
*G06F 11/00* (2006.01)
*H04L 1/00* (2006.01)

(52) U.S. Cl.
CPC ............ *H04L 1/0045* (2013.01); *H04L 1/0072* (2013.01)

(58) Field of Classification Search
CPC ..................... H04N 21/23602; H04N 21/4342
USPC ............................................ 714/6.1, 6.11, 48
See application file for complete search history.

(56) References Cited

U.S. PATENT DOCUMENTS

| | | | |
|---|---|---|---|
| 5,475,808 A | 12/1995 | Kobayashi | |
| 8,792,348 B1* | 7/2014 | Channabasappa | 370/235 |
| 2011/0156936 A1* | 6/2011 | Kim et al. | 341/100 |
| 2013/0010168 A1 | 1/2013 | Pourbigharaz | |
| 2014/0006649 A1* | 1/2014 | Wiley et al. | 710/8 |
| 2014/0189427 A1* | 7/2014 | Jayaprakash Bharadwaj et al. | 714/15 |

* cited by examiner

*Primary Examiner* — Dieu-Minh Le
(74) *Attorney, Agent, or Firm* — Winston Hsu; Scott Margo

(57) ABSTRACT

A serial interface packet information detection and control method for a Mobile Industry Processor Interface is disclosed. The serial interface packet information detection and control method includes receiving and decoding a packet; generating a control signal according to packet information of a header of the packet; and disabling a function register according to the control signal.

18 Claims, 6 Drawing Sheets

SERIAL INTERFACE PACKET INFORMATION DETECTION AND CONTROL METHOD AND RECEIVER THEREOF

BACKGROUND OF THE INVENTION

1. Field of the Invention

The present disclosure relates to a serial interface packet information detection and control method and the receiver thereof, and more particularly, to a serial interface packet information detection and control method and the receiver thereof, which can enable/disable a function register according to a packet information so as to timely turn off the writing function of the function register in transmitting processes, thereby preventing errors from being written into the function register—which might cause the display device function mistakenly—and enhancing protection against noise in the transmitting processes.

2. Description of the Prior Art

As science and technology develop rapidly, handheld devices such as smart phones and personal digital assistants (PDA) have integrated more and more communication and display techniques so as to realize various application functions. In order to manipulate various application functions simultaneously, it requires a high-speed processing interface between a processor and a display panel (i.e. between a host and a slave) of a smart handheld device to speed up data transmission and thus improve display quality or touching functions of the panel. The mobile industry processor interface (MIPI) is a high-speed serial interface used widely in current industry. However, in the conventional techniques, if interference resulting from noise occurs in data transmitting processes, errors may be written into a function register of the receiving terminal, which causes abnormal display operations.

Please refer to FIG. 1. FIG. 1 is a schematic diagram illustrating a conventional packet 10 which complies with a MIPI Display Serial Interface (DSI) long packet protocol. As shown in FIG. 1, the packet 10 comprises a header 100, a payload 102 and a footer 104. The header 100 comprises a data identifier (data ID) field 106, a word count field 108 and an Error Correcting Code (ECC) field 110. The payload 102 comprises the data fields $D_0, \ldots, D_n$. The footer 104 comprises an error checking code field.

In short, the Error Correcting Code field 110 can ensure the reliability, the validity and the completeness of the data of the data identifier field 106 and the word count field 108. When a receiver receives the packet 10 via the MIPI Display Serial Interface, the receiver can determine whether any error occurs according to the Error Correcting Code field 110. If any error is found, the error is corrected instantly or following parts of the packet 10 are ignored. As a result, even if the header 100 is interfered by noise, inaccurate data is not written.

In the payload 102, the footer 104 comprises the error checking code field which can determine the completeness of the received payload 102 after checks. However, during the process of receiving the payload 102, if the payload 102 is interfered, the inaccurate payload 102 resulted from the interference may still be written or even executed. In such a situation, since in the application of the MIPI Display Serial Interface, the first data of the data field $D_0$ is usually a Display Command Set (DCS) and is associated with an address of a display command function register in the receiver, which is utilized to configure the function of the display device, such as turning off the display device, turning on the display device, changing the orientation of the display device. Therefore, if the data field $D_0$ is interfered and thus executed inaccurately, it may cause abnormal display operations of the display device—for example, the display device is mistakenly switched off. As a result, there is still room for improvement in the field.

SUMMARY OF THE INVENTION

It is one of the objectives of the invention to provide a serial interface packet information detection and control method and the receiver thereof, which can enable/disable a function register according to a packet information so as to timely turn off the writing function of the function register in transmitting processes, thereby preventing errors from being written into the function register—which might cause the display device function mistakenly—and enhancing protection against noise in transmitting processes.

To achieve the purposes described above, an embodiment of the invention disclosed a serial interface packet information detection and control method for a Mobile Industry Processor Interface. The serial interface packet information detection and control method includes receiving and decoding a packet, generating a control signal according to packet information of a header of the packet, and disabling a function register according to the control signal.

To achieve the purposes described above, another embodiment of the invention disclosed a receiver for a Mobile Industry Processor Interface. The receiver includes a de-packaging circuit, a control circuit and a functional device. The de-packaging circuit is for receiving and decoding a packet. The control circuit is for generating a control signal according to a packet information of a header of the packet. The functional device is for disabling a function register according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
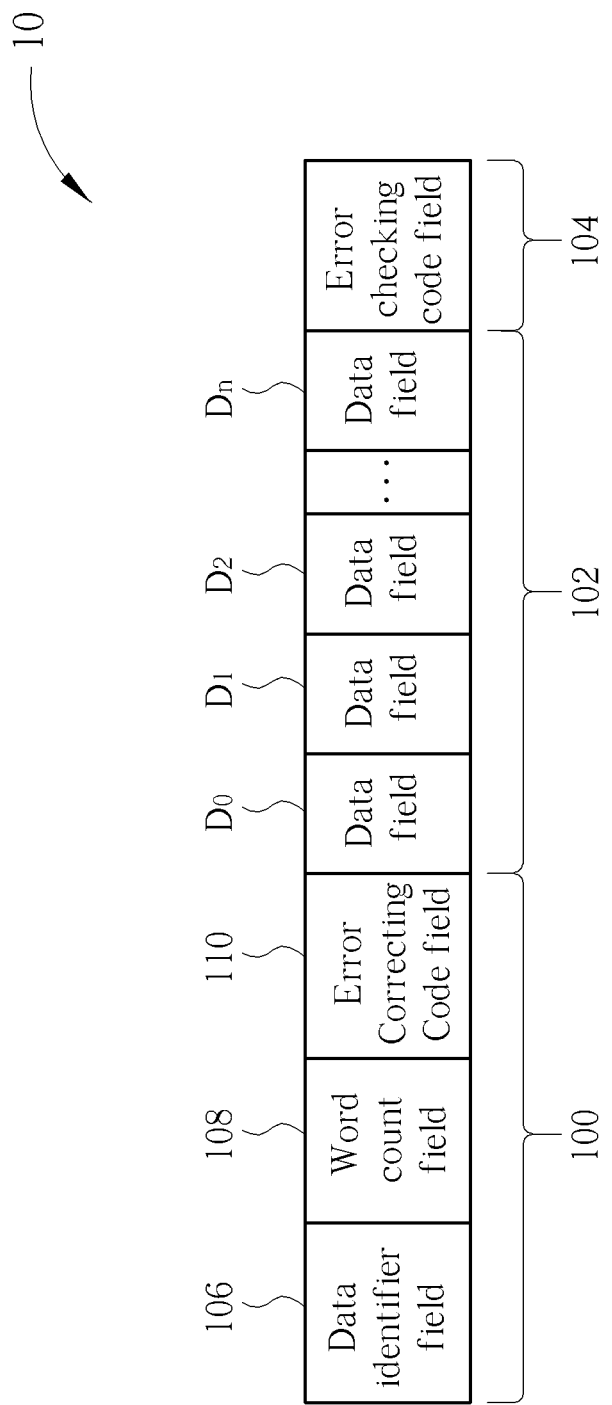
FIG. 1 is a schematic diagram illustrating a conventional packet which complies with a MIPI Display Serial Interface long packet protocol.
Figure 2:
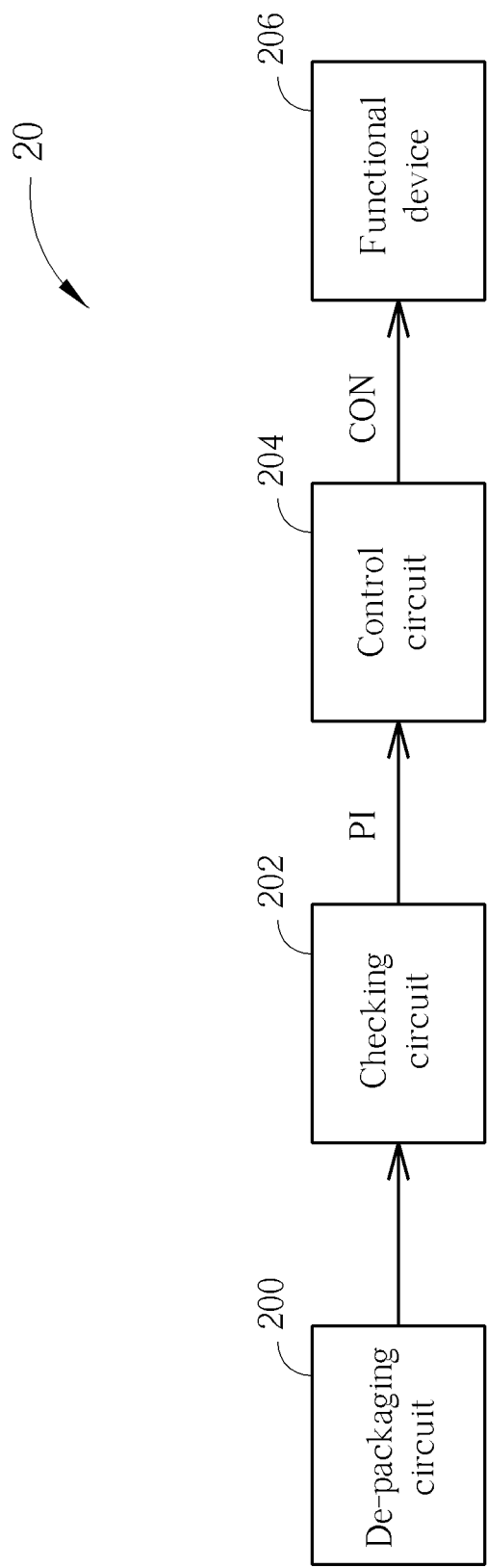
FIG. 2 is a schematic diagram illustrating a receiver according to an embodiment of the present invention.

Please refer to FIG. 2. FIG. 2 is a schematic diagram illustrating a receiver 20 according to an embodiment of the present invention. As shown in FIG. 2, the receiver 20 is for a Mobile Industry Processor Interface (MIPI). The receiver 20 comprises a de-packaging circuit 200, a checking circuit 202, a control circuit 204 and a functional device 206. In short, the de-packaging circuit 200 can receive and decode the packet 10. The control circuit 204 can generate a control signal CON according to a packet information PI of a header 100 of the packet 10. The functional device 206 can disable a function register of a display device according to the control signal CON. The packet 10 is a packet which complies with a MIPI Display Serial Interface (DSI) long packet protocol as shown in FIG. 1. In such a situation, the control signal CON can instruct the functional device 206 to disable a writing function of the function register when the packet information PI indicates that the packet 10 is not utilized to configure the function register. As a result, the function register of the present invention can be either enabled or disabled according to the packet information PI so that the writing function of the function register can be turned off in time in transmitting processes, thereby preventing errors from being written into the function register—which might enable/disable the display device inaccurately—and enhancing protection against noise in the transmitting processes.

Figure 3:
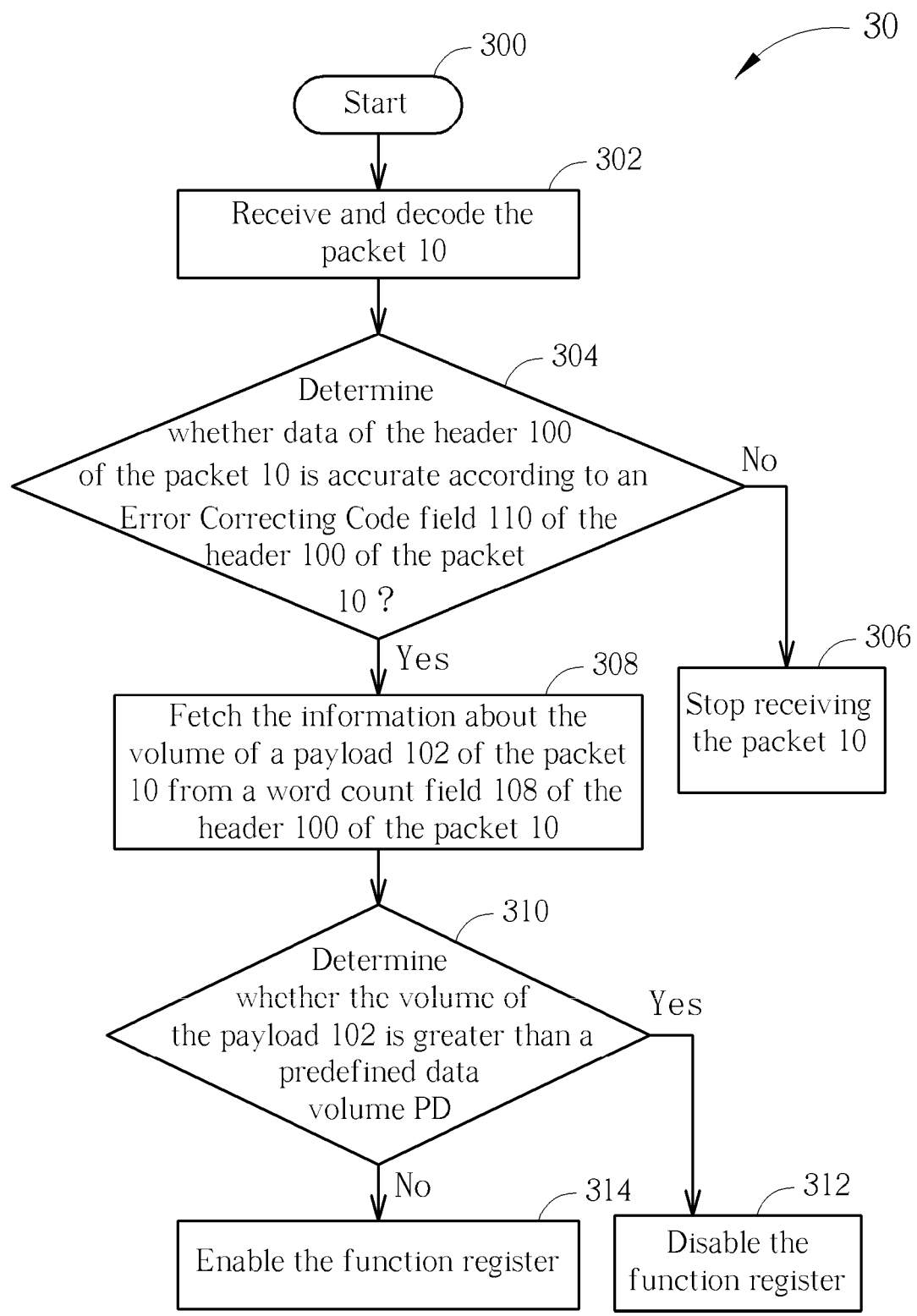
FIG. 3 is a flow chart illustrating a serial interface packet information detection and control process for the receiver shown in FIG. 2.

Further details will be forthcoming. Please refer to FIG. 3. FIG. 3 is a flow chart illustrating a serial interface packet information detection and control process 30 for the receiver 20 shown in FIG. 2. As shown in FIG. 3, the serial interface packet information detection and control process 30 comprises the following steps:

Step 300: Start.

Step 302: Receive and decode the packet 10.

Step 304: Determine whether data of the header 100 of the packet 10 is accurate according to an Error Correcting Code (ECC) field 110 of the header 100 of the packet 10. If no, go to step 306; otherwise, go to step 308.

Step 306: Stop receiving the packet 10.

Step 308: Fetch the information about the volume of a payload 102 of the packet 10 from a word count field 108 of the header 100 of the packet 10.

Step 310: Determine whether the volume of the payload 102 is greater than a predefined data volume PD. If yes, go to step 312; otherwise, go to step 314.

Step 312: Disable the function register.

Step 314: Enable the function register.

According to the serial interface packet information detection and control process 30, the de-packaging circuit 200 first receives and decodes the packet 10. After the de-packaging circuit 200 receives and decodes the header 100 of the packet 10, the checking circuit 202 may determine whether the data of the header 100 of the packet 10 is accurate according to the Error Correcting Code field 110 of the header 100 of the packet 10. If the data of the header 100 is inaccurate, the receiver 20 stops receiving the packet 10. Only when the data of the header 100 is accurate, the receiver 20 continues receiving the packet 10 so as to ensure the reliability, the validity and the completeness of the data of the data identifier field 106 and the word count field 108.

Then, when the data of the header 100 is accurate, the control circuit 204 generates the control signal CON according to the packet information PI of the header 100 of the packet 10. Specifically, when the data of the header 100 is accurate, the control circuit 204 fetches the information about the volume of the payload 102 of the packet 10 (i.e., the packet information PI) from the word count field 108 of the header 100 of the packet 10. Subsequently, if the volume of the payload 102 is less than the predefined data volume PD—that is to say, the packet 10 is utilized to configure the function register of the display device, such as turning off the display device, turning on the display device, changing the orientation of the display device—the control circuit 204 can generate the control signal CON, which can instruct the functional device 206 to enable the writing function of the function register, so as to configure the function register. On the other hand, if the volume of the payload 102 is greater than the predefined data volume PD—namely, the packet 10 is utilized to write the display data to the display device instead of configuring the function register of the display device—the control circuit 204 can generate the control signal CON, which can instruct the functional device 206 to disable the writing function of the function register, so as to maintain the function register to refresh image data.

In such a situation, even if the data field $D_0$ of the payload 102 is interfered when the image data is refreshed according to the packet 10, only an error pixel is displayed on the screen of the display device. Therefore, it prevents the inaccurate data field $D_0$ from being written into the function register, which causes abnormal display operations of the display device. Accordingly, since the checking circuit 202 can ensure the accuracy of the word count field 108 according to the Error Correcting Code field 110, when the word count field 108 indicates that the volume of the payload 102 corresponds to the initiation of refreshing image data, the writing function of the function register is timely turned off, thereby preventing errors from being written into the function register—which might enable/disable the display device inaccurately.

For example, in practical applications of the current MIPI Display Serial Interface under a command mode, the volume of the payload 102 indicated by the word count field 108 is less than 64 bytes when the packet 10 is employed to configure the Display Command Set (DCS) to the function register of the display device, whereas the volume of the payload 102 indicated by the word count field 108 is less than 320*3 bytes when the packet 10 is employed to write the display data to the display device. Accordingly, it can be assumed that when the volume of the payload 102 is greater than 320 bites, it is impossible for the function register to be configured and only the image data is refreshed—namely, the predefined data volume is set to be 320 bites—so as to disable the writing function of the function register and permit only the display data to be written. Therefore, the probability of interference, which causes the function register to be executed by mistake, during refreshing the image data is avoided.

Figure 4:
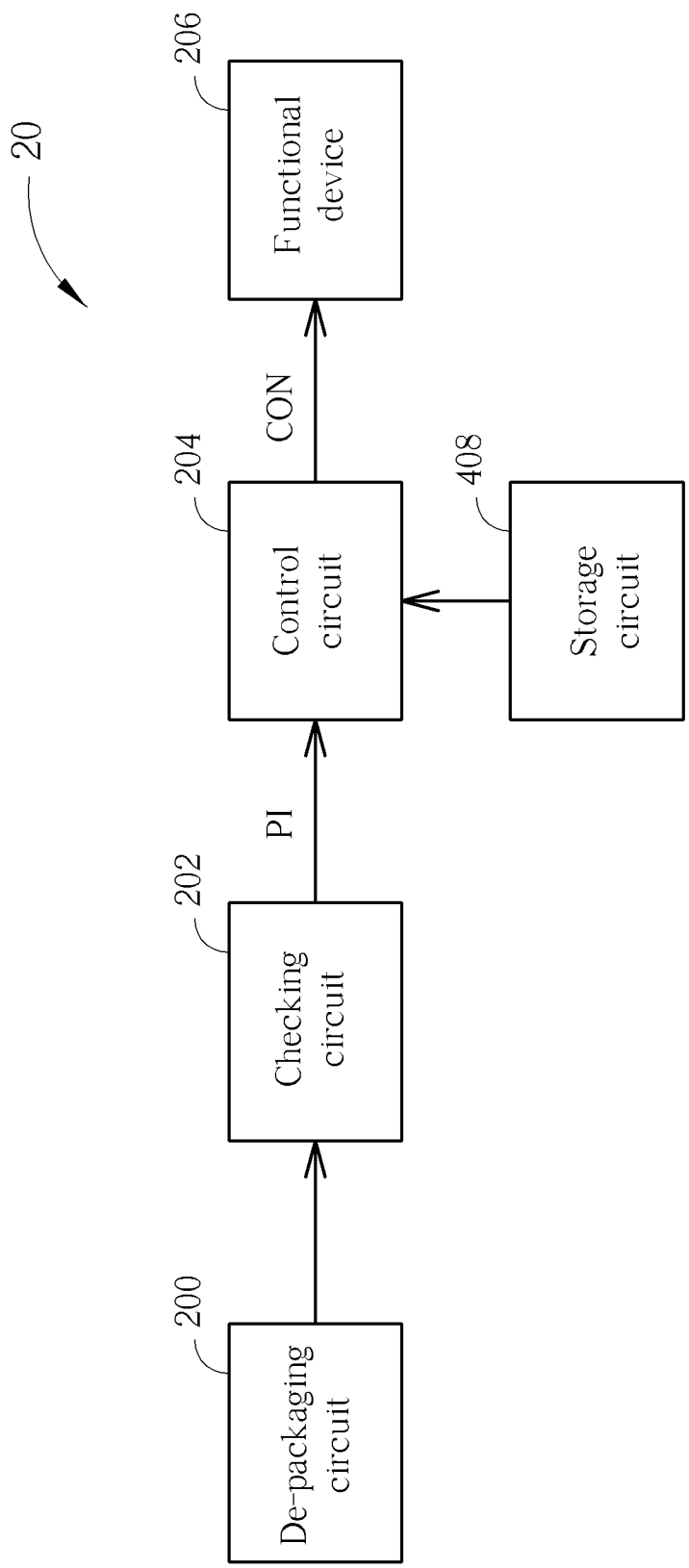
FIG. 4 is a schematic diagram illustrating a receiver according to a variant embodiment of the present invention shown in FIG. 2.

It is worth noting that, in the spirit of the above-mentioned embodiment, the function register can be either enabled or disabled according to the packet information PI so that the writing function of the function register can be turned off in time in the transmitting processes, thereby preventing errors from being written into the function register—which might enable/disable the display device inaccurately—and enhancing protection against noise in the transmitting processes. However, the present invention is not limited thereto, and those skilled in the art might make modifications or alterations accordingly. For example, in the aforementioned embodiment, the predefined data volume PD can be set directly inside the control circuit 204 such that the control circuit 204 may be operated according thereto. In other embodiments, the predefined data volume PD may be provided from external sources. As shown in FIG. 4, the receiver 20 further comprises a storage circuit 408 configured to provide the predefined data volume PD to the control circuit 204. The storage circuit 408 may be any storage media able to be set and stored with any possible approach, such as memory, One Time Programmable (OTP), a buffer, First In First Out (FIFO), Random Access Memory (RAM), flash memory, but not limited thereto.

Besides, in the above-mentioned embodiment of the serial interface packet information detection and control process 30, the control circuit 204 determines whether to configure the function register according to the volume of the payload 102 of the packet 10 and then generates the corresponding control signal CON so as to instruct the functional device 206 to enable/disable the writing function of the function register. Nevertheless, in other embodiments, the control circuit 204 may determine whether to configure the function register according to other packet information PI of the header 100 of the packet 10 and then generate the corresponding control signal CON so as to instruct the functional device 206 to enable/disable the writing function of the function register.

Figure 5:
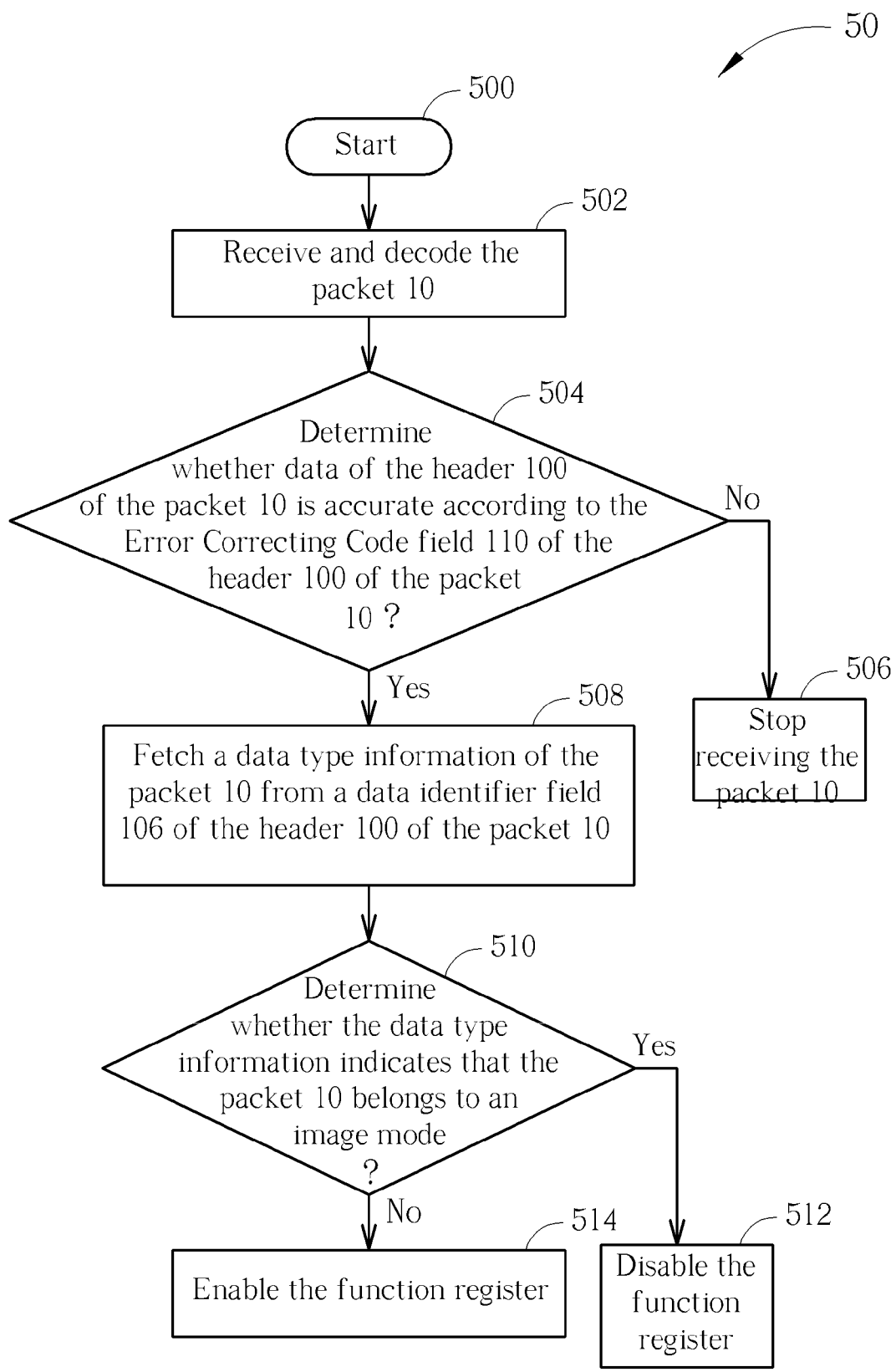
FIG. 5 is a flow chart illustrating another serial interface packet information detection and control process for the receiver shown in FIG. 2.

For example, please refer to FIG. 5. FIG. 5 is a flow chart illustrating a serial interface packet information detection and control process 50 for the receiver 20 shown in FIG. 2. As shown in FIG. 5, the serial interface packet information detection and control process 50 comprises the following steps:

Step 500: Start.
Step 502: Receive and decode the packet 10.
Step 504: Determine whether data of the header 100 of the packet 10 is accurate according to the Error Correcting Code (ECC) field 110 of the header 100 of the packet 10. If no, go to step 506; otherwise, go to step 508.
Step 506: Stop receiving the packet 10.
Step 508: Fetch a data type information of the packet 10 from a data identifier (data ID) field 106 of the header 100 of the packet 10.
Step 510: Determine whether the data type information indicates that the packet 10 belongs to an image mode. If yes, go to step 512; otherwise, go to step 514.
Step 512: Disable the function register.
Step 514: Enable the function register.

The serial interface packet information detection and control process 50 is substantially similar to the serial interface packet information detection and control process 30. Namely, the steps 500-506 and the steps 512-514 are the same as the steps 300-306 and the steps 312-314 respectively. One can refer to the aforementioned illustration for the similar portion. The main difference between the serial interface packet information detection and control process 50 and the serial interface packet information detection and control process 30 is that when the data of the header 100 is accurate, the control circuit 204 fetches the information about a data type information of the payload 102 of the packet 10 from the data identifier field 106 of the header 100 of the packet 10. Subsequently, if the data type information indicates that the packet 10 belongs to a command mode instead of an image mode—that is to say, the packet 10 is utilized to configure the function register of the display device, such as turning off the display device, turning on the display device, changing the orientation of the display device—the control circuit 204 can generate the control signal CON, which can instruct the functional device 206 to enable the writing function of the function register, so as to configure the function register. On the other hand, if the data type information indicates that the packet 10 belongs to an image mode—namely, the packet 10 is utilized to write the display data to the display device instead of configuring the function register of the display device—the control circuit 204 can generate the control signal CON, which can instruct the functional device 206 to disable the writing function of the function register, so as to maintain the function register to refresh image data. Accordingly, since the checking circuit 202 can ensure the accuracy of the data identifier field 106 according to the Error Correcting Code field 110, when the data type information of the data identifier field 106 corresponds to the initiation of refreshing image data, the writing function of the function register is timely turned off, thereby preventing errors from being written into the function register—which might enable/disable the display device inaccurately.

Figure 6:
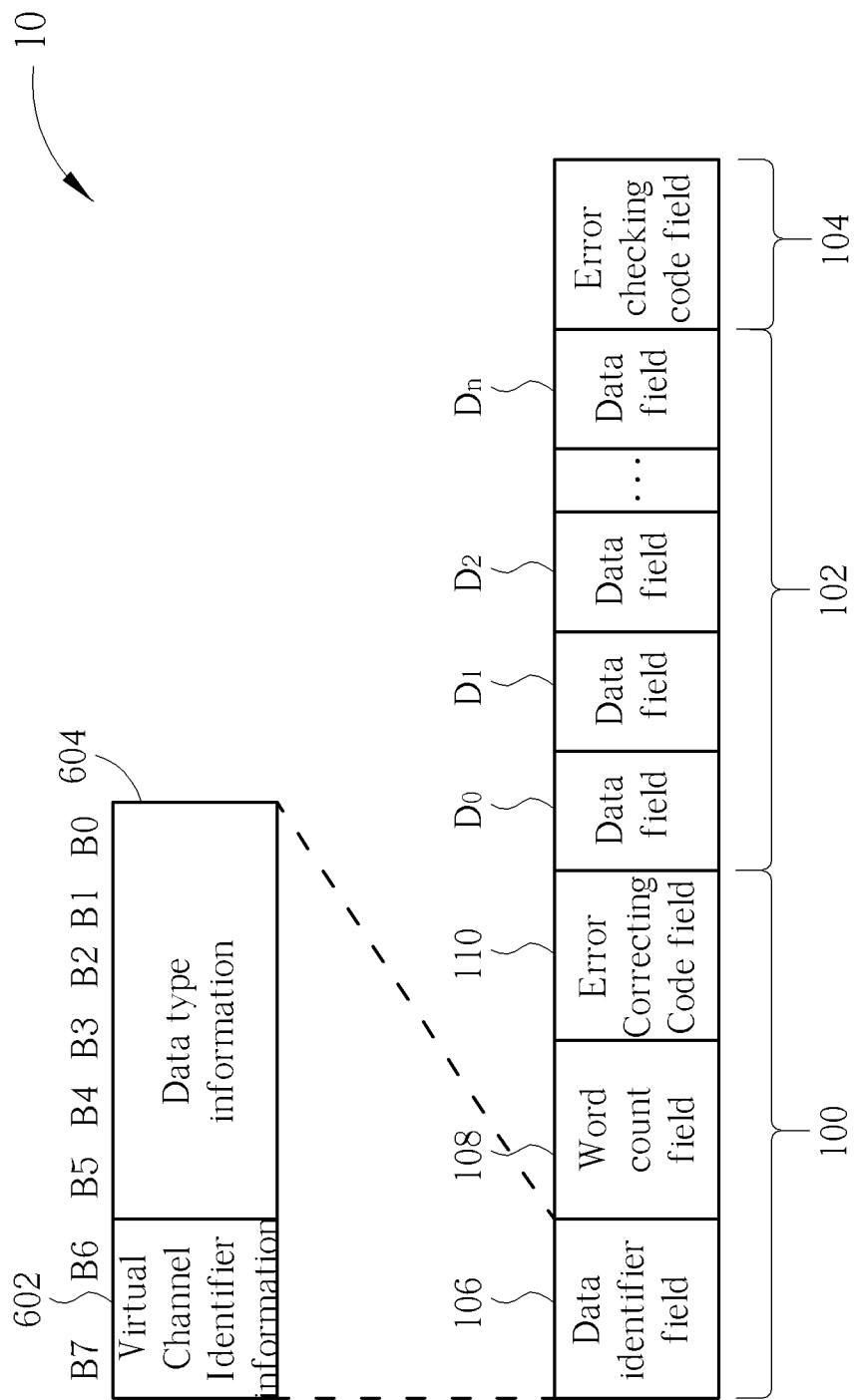
FIG. 6 is a schematic diagram illustrating the data identifier field shown in FIG. 1 with details.

For example, please refer to FIG. 6. FIG. 6 is a schematic diagram illustrating the data identifier field 106 shown in FIG. 1 with details. As shown in FIG. 6, the data identifier field 106 comprises a Virtual Channel Identifier (VC) information 602 and a data type information 604. The Virtual Channel Identifier information 602 is a block of 2 bits; the data type information 604 is a block of 6 bits. The data type information 604 mainly defines the transmission format information of the packet 10. If the coding values of the data type information 604 are 0x08, 0x02, 0x12, 0x22, 0x32, 0x03, 0x13, 0x23, 0x04, 0x14, 0x24, 0x05, 0x15, 0x06, 0x37, 0x09, 0x19, 0x29 and 0x39, the packet 10 belongs to a command mode. In this case, the packet 10 transmits data to configure the function register. Therefore, the control circuit 204 can generate the control signal CON, which can instruct the functional device 206 to enable the writing function of the function register, so as to maintain the function register. If the coding values of the data type information 604 are 0x01, 0x11, 0x21, 0x31, 0x0C, 0x1C, 0x2C, 0x0D, 0x1D, 0x3D, 0x0E, 0x1E, 0x2E, 0x3E and 0x3E, the packet 10 belongs to an image mode. In this case, the packet 10 only transmits display data instead of data to maintain the function register. Therefore, the control circuit 204 can generate the control signal CON, which can instruct the functional device 206 to disable the writing function of the function register, so as to maintain the function register to refresh image data, thereby preventing errors from being written into the function register—which might enable/disable the display device inaccurately.

It is worth noting that the data type information 604 associated with the coding values of the image mode (i.e., 0x01, 0x11, 0x21, 0x31, 0x0C, 0x1C, 0x2C, 0x0D, 0x1D, 0x3D, 0x0E, 0x1E, 0x2E, 0x3E and 0x3E) can be directly set in the control circuit 204 (as shown in FIG. 2) such that the control circuit 204 can be operated according thereto. However, the data type information 604 associated with the coding values of the image mode may be provided to the control circuit 204 from external sources as the storage circuit 408 shown in FIG. 4.

In the prior art, although the footer 104 comprises the error checking code field which can determine the completeness of the received payload 102 after checks, if the data field $D_0$ in the payload 102 is interfered and thus executed inaccurately during the process of receiving the payload 102, it may cause abnormal display operations of the display device—for example, the display device is mistakenly switched off. In comparison, in the present invention, the function register can be either enabled or disabled according to the packet information PI so that the writing function of the function register can be turned off in time in the transmitting processes, thereby preventing errors from being written into the function register—which might enable/disable the display device inaccurately—and enhancing protection against noise in the transmitting processes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A serial interface packet information detection and control method for a Mobile Industry Processor Interface (MIPI), the serial interface packet information detection and control method comprising:
receiving and decoding a packet;

generating a control signal according to a packet information of a header of the packet; and disabling a function register according to the control signal.

2. The serial interface packet information detection and control method of claim 1, wherein the packet is a MIPI Display Serial Interface (DSI) packet.

3. The serial interface packet information detection and control method of claim 1, wherein the step of disabling the function register according to the control signal comprises:

disabling the function register when the packet information instructs the packet not to configure the function register.

4. The serial interface packet information detection and control method of claim 1, wherein the step of generating the control signal according to the packet information of the header of the packet comprises:

determining whether data of the header of the packet is accurate according to an Error Correcting Code (ECC) field of the header of the packet; and generating the control signal according to the packet information of the header of the packet when the data of the header of the packet is accurate.

5. The serial interface packet information detection and control method of claim 1, wherein the step of generating the control signal according to the packet information of the header of the packet comprises:

generating the control signal according to a word count field of the header of the packet.

6. The serial interface packet information detection and control method of claim 5, wherein the step of disabling the function register according to the control signal comprises:

disabling the function register when the word count field indicates that a volume of a payload of the packet is greater than a predefined data volume.

7. The serial interface packet information detection and control method of claim 1, wherein the step of generating the control signal according to the packet information of the header of the packet comprises:

generating the control signal according to a data identifier (data ID) field of the header of the packet.

8. The serial interface packet information detection and control method of claim 7, wherein the step of disabling the function register according to the control signal comprises:

disabling the function register when a data type information of the data identifier field indicates that the packet belongs to an image mode.

9. A receiver for a Mobile Industry Processor Interface (MIPI), the receiver comprising:

a de-packaging circuit, for receiving and decoding a packet;

a control circuit, for generating a control signal according to a packet information of a header of the packet; and a functional device, for disabling a function register according to the control signal.

10. The receiver of claim 9, wherein the packet is a MIPI Display Serial Interface (DSI) packet.

11. The receiver of claim 9, wherein the control signal instructs the function device to disable the function register when the packet information instructs the packet not to configure the function register.

12. The receiver of claim 9, further comprising a checking circuit for determining whether data of the header of the packet is accurate according to an Error Correcting Code (ECC) field of the header of the packet, wherein the control circuit generates the control signal according to the packet information of the header of the packet when the data of the header of the packet is accurate.

13. The receiver of claim 9, wherein the control circuit generates the control signal according to a word count field of the header of the packet.

14. The receiver of claim 13, wherein the control signal instructs the function device to disable the function register when the word count field indicates that a volume of a payload of the packet is greater than a predefined data volume.

15. The receiver of claim 14, further comprising a storage circuit for providing the predefined data volume to the control circuit.

16. The receiver of claim 9, wherein the control circuit generates the control signal according to a data identifier (data ID) field of the header of the packet.

17. The receiver of claim 15, wherein the control signal instructs the function device to disable the function register when a data type information of the data identifier field indicates that the packet belongs to an image mode.

18. The receiver of claim 17, further comprising a storage circuit for providing coding values of the image mode to the control circuit.

* * * * *